United States Patent Office 3,348,102
Patented Oct. 17, 1967

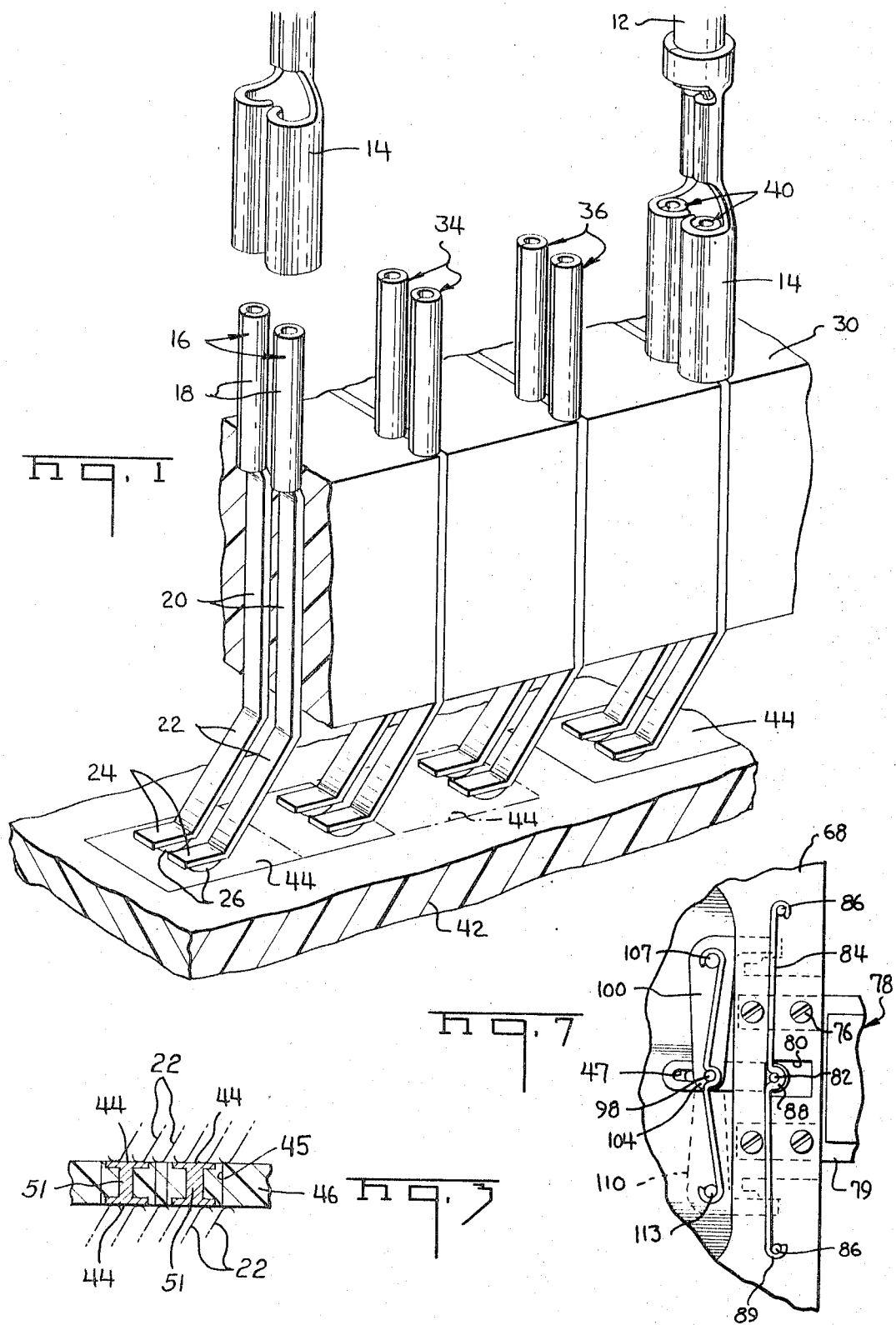

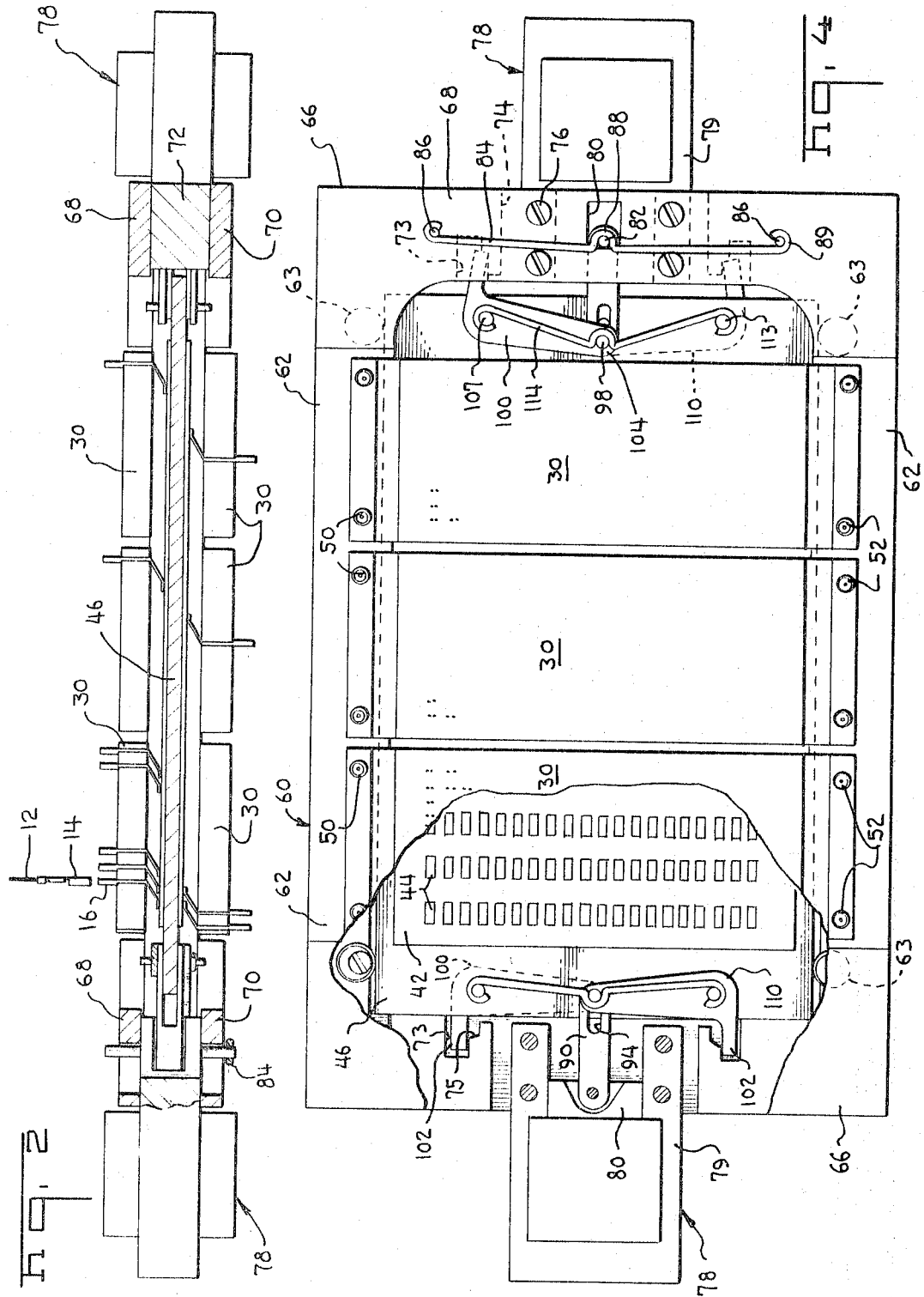

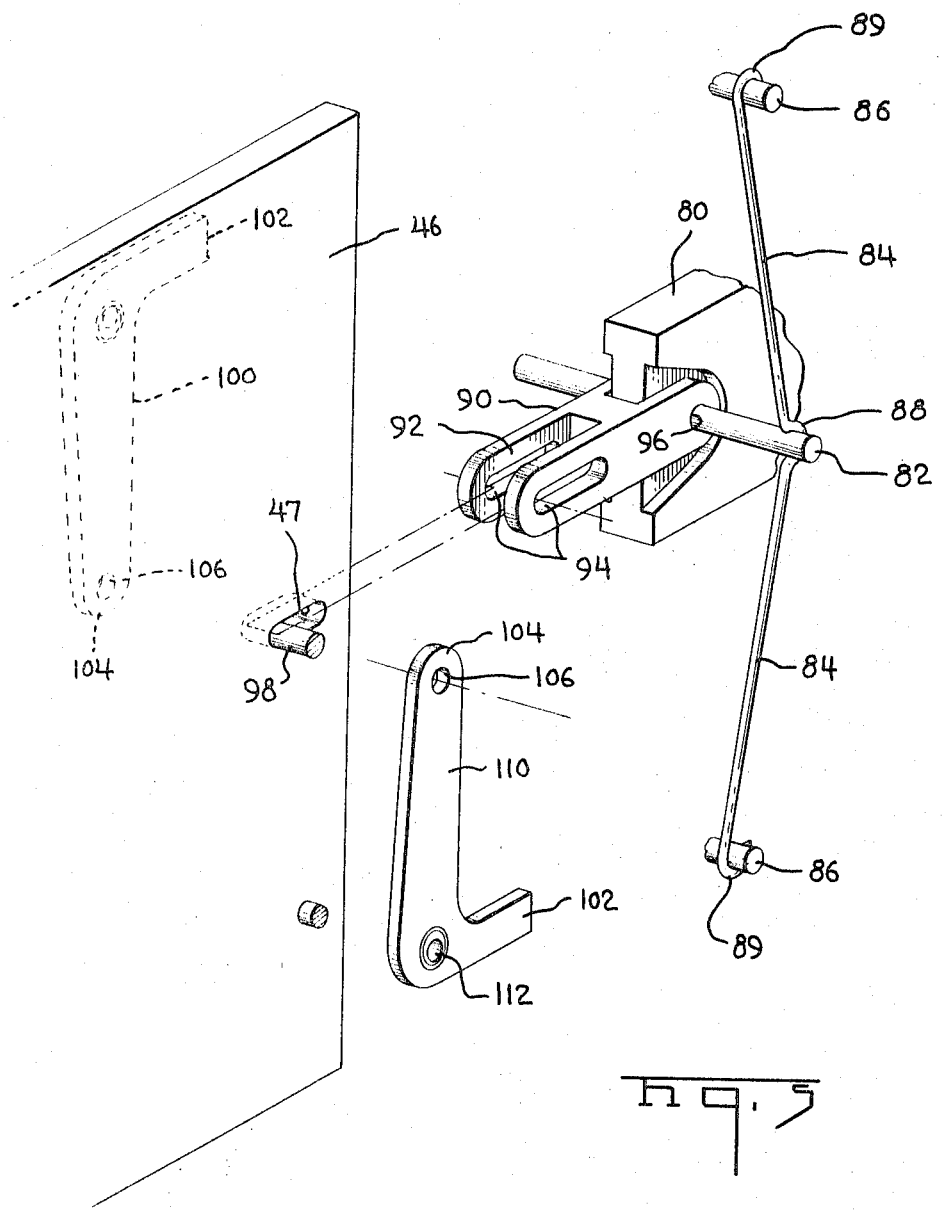

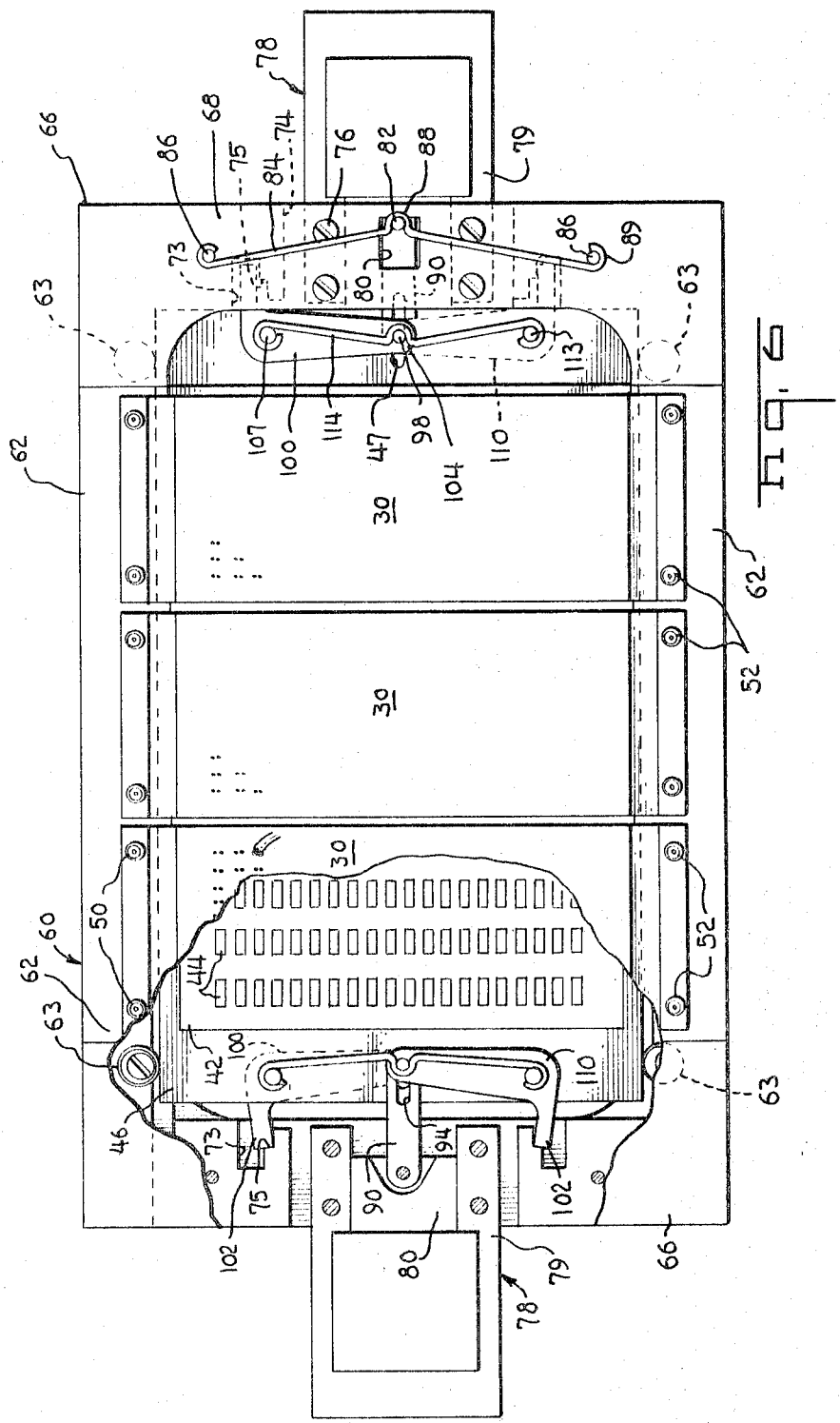

3,348,102
ASSEMBLY AND DRIVE MECHANISM FOR ELECTRICAL SWITCHES AND CONNECTORS
Cornelius William Bosland, Bruce Richard McFadden, and Ronald John Brookman, Harrisburg, Pa., assignors to AMP Incorporated, Harrisburg, Pa.
Filed Sept. 7, 1966, Ser. No. 577,744
12 Claims. (Cl. 317—112)

ABSTRACT OF THE DISCLOSURE

An electric switch is disclosed having multiple spring contact members held in arrays by insulating blocks supported by a metallic frame having a central opening containing a movable plate having conductive pads on each side thereof. The plate is supported in part by an engagement with the contact springs on each side thereof and is movable in an opposite sense to interconnect different sets of contact springs for switching purposes. A drive solenoid is attached to each end of the frame to drive the plate for this purpose and a linkage is provided for each drive which locks the plate against displacement responsive to operation of a drive at the opposite end of the frame.

Background of the invention

In applications which require more than several hundred circuits to be switched simultaneously the prior art has frequently turned to a type of multiple switch known as a plugboard, an early example of which is shown in U.S. Patent No. 2,111,118 to C. D. Lake granted Mar. 15, 1938. Devices of this type were developed to permit manual programming changes in computers and accounting equipment, and are satisfactory for general use in switching or connecting if there is no particular limitation on response time or size, such devices being relatively slow to operate and relatively large in terms of number of switches accommodated per unit volume occupied. As a further point programming devices of usual construction do not provide make-before-break or break-before-make functions and cannot therefore be used in many switch applications.

Summary of the invention

It is an object of the present invention to overcome these various shortcomings by providing an assembly capable of use in switching or connecting applications wherein there are a large number of leads and circuit paths which must be accommodated in a device which is small and compact and which is capable of carrying out its function repeatedly through a large number of cycles at a relatively high speed of operation.

It is a further object of the invention to provide an assembly, carriage and drive mechanism for making and/or breaking a relatively large number of electrical circuit paths through a spring contact structure which is under constant force in all positions of use, make, break, connect, and disconnect.

It is another object of the invention to provide an assembly and carriage mechanism for switching and connecting functions under motor drive with a locking mechanism which prevents improper operation or accidental switch closure under impact or vibratory forces.

It is still another object of the invention to provide an assembly carriage and drive mechanism for a large capacity electrical switch or connector which includes a flexible contact structure arranged to provide long contact life and constant contact characteristics in repeated use.

It is yet another object of the invention to provide an electrical switch and connector apparatus having a large number of resilient spring members which are supported and mounted in a manner to facilitate assembly and use of the apparatus with each of such spring members being positively biased into contacting position, notwithstanding variations in position of such members.

The foregoing objectives are attained in the present invention through the provision of an assembly which has a rigid frame having a rectangular opening therein into which is fitted a movable plate, also of rigid construction, with such plate carrying a number of contact pads and with banks of contact spring members mounted on either side of the frame and caused to bear against the plate at all times and in all positions of movement to effect switching or connecting functions. The banks of switch contacts are made to accommodate input and output leads and are attached to the frame so as to force depending and obliquely disposed spring contact members against such plate. The contact members operate to center the plate and are oriented so that plate movement requires the same applied force in opposite directions. The plate is made to include insulating and conductive portions in patterns such that a controlled short stroke movement of the plate parallel to the switch banks effects a connection or disconnection between contact spring members and between leads connected thereto. In a specific embodiment a drive mechanism is provided which serves to axially position the plate relative to the spring members and to automatically lock the plate and drive against accidental displacement.

In the drawings:

FIGURE 1 is a perspective considerably enlarged showing a portion of the invention assembly including a number of contact members as secured in a contact bank which is positioned relative to the driven plate of the invention assembly;

FIGURE 2 is a longitudinal section showing the assembly, carriage and drive mechanism of the invention;

FIGURE 3 is a section showing an alternative embodiment adapted for switching through the plate structure of the invention rather than across the surface thereof;

FIGURE 4 is a plan view showing portions of the carriage and drive mechanism of the assembly of the invention in one position;

FIGURE 5 is a perspective showing details of portions of the drive linkage and mechanism of the assembly in greater detail;

FIGURE 6 is a plan view showing the mechanism of FIGURE 4 is a different position; and FIGURE 7 is a plan view of a portion of the drive mechanism and linkage in yet a different position from that shown in FIGURES 4 and 6.

Description of preferred embodiment

Before going into a detailed description of the various components which make up the assembly, carriage and drive of the invention, a general reference will be made to FIGURES 2 and 4 which show an embodiment of the invention in side and plan views. The object of the assembly thereshown is to controllably make and break or connect and disconnect circuits fromed between a plurality of electrical leads which are brought up to and attached to the assembly through a series of terminals. In FIGURE 2 one such lead is shown as 12, terminated by a terminal shown as 14, which in use is made to engage a pair of contact members shown as 16. The idea is that with various leads connected to various contact members a controlled movement can be effected by the plate member 46 to accomplish switching or connection functions. The contact members are held in contact banks shown as 30 carried on either side and attached to a frame 60. The plate member 46 is positioned between opposing contact banks and carried on each major surface a further plate made up of insulating and conducting portions, the insulating plate being shown as 42 with conductive pads in one embodiment being shown as 44. To each end of the plate 46 there is attached a mechanism intended to drive the plate axially in the plane of the drawing. Each mechanism is connected to a solenoid such as 78, which when energized applies a desired electromechanical drive to the plate. Each drive mechanism includes features which operate to lock the plate in a given position upon the cessation of energy applied to a given solenoid.

It is contemplated that following the teaching hereinafter to be given the patterns of connection or of switch function may be varied so as to connect certain leads together and at the same time disconnect other leads. This may be accomplished between leads in a side-by-side relationship in rows transverse to the sense of movement of the plate or in rows extending along the length of movement of the plate as is shown.

In one embodiment a plate construction is shown for accomplishing a switching or connecting function through the plate rather than through a conductive surface mounted on one or the other sides of the plate.

The plate of the assembly is supported along its edges by point or line contacting roller bearings which include adjustments for ease of assembly and maintenance. The plate is supported against movement transverse to its major surfaces by the various contact spring members of the switch bank held on either side thereof by an attachment to the frame of the assembly. Each of the contact spring members is made to be permanently deflected by a relatively constant amount by the thickness of the plate relative to the disposition of the switch banks. This serves as a self-centering support for the plate and also to alleviate production or assembly tolerances which may place one contact spring member out of position relative to another member. It also means that switching and connection functions may be accomplished through a movement of the plate with zero displacement of the contact spring members in the sense of spring action of each member. As will be observed from FIGURE 2, the spring members are made to have a considerable angle relative to the plane of the plate and the plane of the switch banks. There is considerable clearance provided between the plate and the switch banks so that there is no criticality of either production or assembly tolerance other than to avoid causing the individual springs to be deflected to a point of possible engagement each with the other. The possibility of this happening is considerably reduced by the use of zero deflection of the contact spring members. In accordance with a preferred embodiment of the invention the outer surfaces of the major planes of the plate are made to be smooth with no edges or sharp surfaces between the conductive and insulating portions thereof. This further assures the zero displacement contact spring member action heretofore referred to.

As an important point, by loading the contact spring members it has been found that the assembly is relatively insensitive to vibration and shock loads.

Referring now in greater detail to the invention, reference is made to FIGURE 1, which shows a portion of the insulating plate 42 carrying conductive pads 44 embedded and flush with the surface thereof to define a smooth surface engaged by the various spring contact members. Positioned above the plate is a contact bank 30 which is comprised of a series of insulating blocks fastened together to entrap and hold a series of spring members therebetween. The blocks which form 30 may be made of a thermosetting plastic, such as diallyl phthalate, having slots therein so as to permit the various blocks to be bonded together by a suitable adhesive and clamped together to rigidly lock the various contact members therein. The ends of the blocks may then be secured to the frame of the assembly in a manner to be described.

Each of the spring members 16 includes a barrel portion shown as 18, which could alternatively be a soldering tab, a taper pin receptacle or some other terminal member if desired. Extending from the barrel portion 18 is a flat portion 20 which is entrapped within the switch bank blocks. Depending from the portion 20 and extending at an angle therefrom is a further portion 22, which is thin and flat and which constitutes a spring member. On the end of 22 is a further portion 24 carrying thereon a contact pad 26. It is preferred that the spring members 16 be formed of spring grade brass with the contact pads 26 being welded thereto out of a suitable precious metal alloy. Contact buttons formed of various long wearing precious metal alloys are known in the art.

In the embodiment shown in FIGURE 1 there is a redundancy of contact structure with two contact members 16 being mounted side-by-side to accommodate an identical switching or connecting function. The two members 16 shown to the left in FIGURE 1 then are intended to conduct or not conduct the same current and their duplication is to improve reliability. The upper barrel portions 18 of the two contact members are placed side-by-side and are spaced so as to be engaged by a single terminal which is formed of sheet metal to include two rounded spring portions as indicated and a further portion crimped to the end of a lead. The terminal 14 is shoved onto the two barrel portions 18 to terminate the lead 12 to two contact members 16 as is indicated to the right by the terminal fitted onto the contact members 40 in FIGURE 1.

To the right of the contact member 16 is shown a pair of contact members 34 and then a pair of contact members 36. With the plate in the position shown solidly in FIGURE 1 there is a connection between the contact members 16 and the contact members 34, and current applied to a lead connected to 16 will flow through the members 16 through the contact paths 26 and into the conducting pad 44 mounted in the insulating plate 42. From there it will flow through the contact paths of the contact members 34 and out through a lead connected to 34. If the plate is driven so that the contact pad 44 is in the position shown dotted in in FIGURE 1, the connection between 16 and 34 will be broken and a connection will be established between members 34 and members 36 through the contact pad 44. Since the surface of 42 and 44 is smooth and since the plate 42 is driven in a plane parallel with the ends of the various contact members there can be no displacement of the spring members. As heretofore mentioned and as will be detailed hereinafter, the spring blocks are held so as to cause the various contact spring members to bear against and to be initially deflected (at assembly) by the surface including the contact pads 44 and the insulating portions of the surface of 42. This deflection is controlled so as to make sure that all spring members will be in firm bearing engagement with the plate, notwithstanding slight deviations in production or assembly placement of the contact banks of the individual contact members or of the plate itself. The residual spring force also operates to prevent vibrating or shock forces from causing the contact members to lift up and break contact in the associated circuits.

As can be discerned from FIGURES 2 and 4, there is an assembly identical to that shown in FIGURE 1, engaging the other side of the plate 46 and an insulating plate like 42 carrying contact pads like 44. As will be observed from FIGURE 2, the inclination of the spring members on one side of the plate is made to be in an opposite sense to the inclination of spring members on the other side of the plate. In this way the force required to drive the plate in one direction is made to be the same as the force required to drive the plate in an opposite direction. As a further point, the particular orientation of the spring members with their length axes in the general direction of travel of the plate has been found to produce a better contact having a longer life than spring members which are oriented transverse or at some other angle generally crossing the axis of travel of the plate. This is believed to be due to the fact that the scrubbing action and loading of the various contact spring members, arranged as indicated, is through a loading which is either almost in pure tension or pure compression and definitely without torsional loading of the spring members as would be the case otherwise. The relatively large angle of incidence between the spring members and the plane of the surface of the plate in conjunction with the length of the spring members is important to both ease of assembly of the device and to its characteristics in use. These features permit a substantial deflection of the spring members during assembly without excessive forces which would cause undue wear of the precious metal contact surfaces. At the same time this construction permits a wiping action which is desirable for providing a low resistance interface between the various contact surfaces. In use, as the device is caused to wear, the contact members readily accommodate such wear by reason of the stored energy achieved through their substantial deflection during initial assembly.

FIGURE 3 shows an embodiment wherein the plate 46 is made to include a series of apertures shown as 45 into which are fitted insulating bushings shown as 49, carrying contact pads 44 on each surface thereof with such contact pads being interconnected as by conductive members shown as 51. In this embodiment displacement of the plate is made to provide a switching or connecting function through the plate rather than through its surface. In either embodiment, however, it is contemplated that switching or connecting functions may be accommodated with the assembly of the invention. It is also contemplated that programming may be carried out relative to a switching or connecting function by using certain of the leads such as 12 on one or both sides of the assembly as inputs and outputs and by using busing leads terminating selected others of the contact members in desired patterns.

As should now be apparent, the invention assembly readily permits a large number of switching or connecting functions to be accommodated in a relatively small space.

Referring now to FIGURES 4 and 5, a description will be given as to the frame, carriage and drive mechanism of the assembly of the invention. In FIGURE 4 the frame is shown as 60. It includes a pair of side rails shown as 62 rigidly held in spaced relationship by end members 66 which are bolted or otherwise fastened thereto. The end members each include outer plates, such as 68 and 70, (see FIGURE 2) between which is a core 72 comprised of separate pieces as shown in FIGURE 4. The pieces are spaced to accommodate a drive linkage and solenoid fitted between plates 68 and 70 in the center of the end members. It is contemplated that the frame 60 may preferably be made of a single casting rather than of separate pieces secured together. It is in any event made to be of a thickness and of a material so as to be quite rigid. Across and between the rail members 62 are mounted the switch banks 30 which are attached to each rail member by bolts shown as 50 at the top in FIGURE 4 and at the bottom by bolts shown as 52. The spacing between the plate 46 and the contact bank 30 is shown in FIGURE 2. Interiorly disposed within each rail are four or more point or line roller bearings shown as 63. These are of a construction to permit an adjustment inwardly to catch and engage the outer edges of the plate 46 and support such for sliding movement along the plane of the drawing. As heretofore mentioned, the contact members by engaging the plate on either side under spring pressure serve to support and center the plate in the plane transverse to the drawing. The screws shown in the components 63 are provided so that when loosened the bearing surfaces turn on an eccentric to move inwardly or outwardly for ease of adjustment.

In assembly with either the top or bottom contact banks removed the plate may be inserted in the opening between rails 62. Then the removed contact banks may be placed in position and bolted down to center the plate between opposing switch banks. In this position the bearings 63 may be adjusted to bear against the edges of the frame. The structure just described limits and positions the plate within the frame in all directions except along the length of the frame.

At each end of the frame attached to the end members 66 are latching and driving mechanisms. This linkage is arranged so as to have sufficient float transverse to the direction of plate movement to permit the contact members to effect the centering action previously described. Each is identical to include a solenoid 78 having a U-shaped yoke 79 bolted or otherwise secured to top and bottom plates 68 and 70 between the core pieces 72. The solenoid has an armature shown as 80, which is driven back and forth within the yoke as the solenoid is energized with such movement being otherwise limited by the drive mechanism attached thereto.

This mechanism can be seen to be identical at each end to include as shown in FIGURE 5 a linkage from the solenoid armature 80 engaging the plate 46 and parts of the frame 60. There is a link 90 attached to the armature 80 by a pin 82 inserted therethrough and made to extend out on either side of the end of pieces 68 and 72 to be engaged by a V-shaped spring member shown as 84. The spring member 84 is U-shaped in its center as at 88 to catch the pin 82 and is turned at each end as at 89 to fit over and be secured to posts 86 secured to the frame plates 68 and 70 in the manner shown in FIGURES 2 and 4 to the right. The right-hand spring member 84 is shown in a substantially unloaded position in FIGURES 4 and 7 and in its loaded position in FIGURE 6. As will be apparent, spring 84 tends to bias the armature 80 inwardly (to the left with respect to the right end of FIGURES 4 and 6) to a given position. The spring operates when the solenoid associated therewith is de-energized to position the armature and link 90 against a pin 98 and the plate to prevent floating in the event of shock or vibratory forces. The link 90 is bifurcated at 92, as shown in FIGURE 5, and includes a pair of slots 94 extending therealong. The bifurcation, as at 92, is made so that the link may be fitted over the plate 46 with the slot 94 aligned with a slot 47 of lesser length in the center toward the outside end of the plate. Pin 98 is made to extend through the slot 47 in plate 46 and through the slots 94 of the link 90 tying the plate to the link. The pin 98 is made of a length to extend out through a pair of rocker arms, shown as 100 and 110, mounted on the end of the plate. Each of the arms is tied for rotary movement by an eccentric bearing such as is shown relative to arm 110 by numeral 112 to permit rotary movement of the arm and is provided with a screw to permit an adjustment of the position of the bearing and arm relative to the remainder of the assembly. Each of the arms include a portion such as 102 shown relative to arm 100, which extends back toward the solenoid and an end portion such as 104, apertured as at 106 to receive the pin 98.

As indicated in FIGURE 5, one of the arms, such as 100, is placed on one side of plate 46 and the other arm is placed on an opposite side thereof. Centered on the pivot point as at 106 and fixed thereto is a pin 107. Centered on the pivot point as at 112, but on the opposite side of plate 46, relative to arm 110 is a pin 113. Secured to pin 98 is a spring member shown as 114, which has its outer ends wrapped around the pins 107 and 113 and its center U-shaped to engage 98 in the manner shown in FIGURE 4. This spring member has a substantially unloaded position as shown to the right in FIGURE 4 and a loaded position as shown to the left in FIGURE 4. The spring 114 tends to bias the arms 100 and 110, such that the outer ends such as 112 pivot inwardly. The core pieces 72 of the frame end contain recessed portions such as 73 shown in FIGURE 4 to accommodate the outer ends of the arms and there is an offset shown as 75 in FIGURE 4 which engages the outer ends of the arms when the plate is driven. The spring 114 thus causes the arms to snap inwardly to engage the face 75 of each recess and lock the plate against movement in one sense.

The drive and linkage mechanism just described works as follows. With the assembly in the position shown in FIGURE 4 the right-hand solenoid is de-energized and the left-hand solenoid has just been energized to pull the plate to the left. The plate is held in its leftward displacement to effect a selected connection of contact members, such as 16 and 34, in the manner shown in FIGURE 1. The plate is at this time prevented from displacement to the right by reason of the arms 100 and 110 at the right-hand end of the assembly which are positioned inwardly in engagement with the offsets 75 in the recesses 73. In FIGURE 4 it will be observed that the left-hand end of the slot 47 is against the pin 98, which in turn has been drawn to the right by link 90 and by 80 of the right-hand solenoid. When the left-hand solenoid is de-energized the armature will move to the right to the position shown dotted, under force of the associated spring 84. Movement or displacement to the left in FIGURE 4 is prevented by the engagement of the left edge of the plate with the inner surface of the core pieces 72 of the frame 60.

Assuming now that it is desired to effect a switch or connecting operation, the right-hand solenoid 78 is caused to be energized to draw its solenoid armature 80 to the right. When this occurs 80 will draw pin 82 and link 90 to the right of the associated loading spring 84. At this time, since the left-hand end of the slot 94 is in bearing engagement with the pin 98, it will draw such pin to the right and eventually into engagement with the right-hand end of slot 47 in the plate. Before this occurs the arms 100 and 110 will be rotated, loading spring 114 and displacing the ends such as 102 from the offsets 75 to clear the arms from the locking position. Then engagement by pin 98 with the right-hand end of slot 47 will apply force to the plate drawing it to the right and into the position shown in FIGURE 6. This will effect a closure of contacts 34 and 36, as shown dotted as in FIGURE 1. The left-hand spring 114 will cause the arms associated therewith to snap inwardly into engagement with the offset 75, as indicated in FIGURE 6, to lock the plate against leftward displacement. When the right-hand solenoid 78 is de-energized the spring 84 associated with the right-hand linkage will operate to drive the armature back to the left to the position as shown in FIGURE 7, with the right-hand end of slot 94 and slot 47 up against the pin 98. At this time the left-hand mechanism will then be in the locked position shown with the associated armature 80 and link 90 backed off as indicated by the dotted lines so as to be prepared for the next switching or connecting operation wherein the left-hand solenoid 78 will be actuated to effect a leftward displacement of the plate and the ensuing switching or connecting function.

In an actual unit the spring members shown as 16 were made to have a spring arm approximately 340 thousandths of an inch in length depending at an interior angle from the switch banks of approximately 30 degrees. The spacing between the ends of the spring members, such as at the contact paths 26, was approximately 250 thousandths of an inch. The spacing between the inner face of the switch banks and the surface of the contact pad 44 was approximately 180 to 200 thousandths of an inch, prior to loading of the springs and was approximately 150 to 170 thousandths of an inch after the switch banks had been securely fastened to the frame. The stroke or displacement of the plate was arranged to be approximately 250 thousandths of an inch.

Having now disclosed and described the invention in terms intended to enable a preferred mode of practice, we define the invention through the appended claims.

What is claimed is:

1. In an assembly for use in switching or connecting electrical circuit paths the combination comprising a frame member of rigid construction having an opening therein, a plate member of rigid construction positioned in said opening and dimensioned to be displaced therein, means to engage opposite edges of said plate member to confine said plate against movement along the width axis of said frame member and to permit movement along the length axis of said frame member, means attached to said frame extending over the major surfaces of said plate member and spaced therefrom, said means including an array of spring members extending inwardly to engage the opposing major surfaces of said plate member, said spring members being deflected to be spring loaded under substantial pressure against said plate member to center said plate member in said frame member and to support said plate member against movement along an axis transverse to the said width and length axes of said frame member and means connected to said plate member to drive said plate member along said length axis to cause said spring members to engage different portions of the major surfaces thereof.

2. The assembly of claim 1 wherein the said spring members are mounted and oriented in rows with a given row of spring members on one side of said frame and plate member residing in a plane substantially parallel to the spring members in a given row on an opposite side of said plate whereby to provide approximately equal force requirements to drive said plate member in either direction along said second axis in said frame member.

3. The assembly of claim 1 wherein the said spring members are mounted and oriented with the axis of deflection thereof perpendicular to the said length axis of said frame member whereby to reduce torsional loading thereof upon displacement of said plate member.

4. The assembly of claim 1 wherein the said spring members are secured in an insulating block means with electrical leads attached thereto, and said plate member includes conductive paths therein engaged by at least certain of said spring members to interconnect certain of said leads with said drive means operating to effect a switching action between various spring members and the leads attached thereto.

5. The assembly of claim 1 wherein the major surface of said plate member on each side thereof in engagement with said spring members is substantially smooth so as to impart substantially zero displacement to said spring members during movement of said plate member.

6. The assembly of claim 1 wherein the said spring members engage the said plate to define an interior angle of incidence therewith on the order of between twenty and forty degrees.

7. In a drive mechanism for use with electrical switching or connecting apparatus a frame member having an opening therein, a plate disposed in said opening and supported for sliding movement relative to said frame member, first drive means at one end of said frame member operable to drive said plate into a first position and including a first locking means connected thereto, second drive means at the other end of said frame member operable to drive said plate into a second position and a second locking means connected thereto, the locking means being operated to engage said frame member and lock said plate against movement upon operation of a drive means at the end of said frame member opposite thereto, the operation of said drive means operating to free the locking means connected thereto to permit displacement of said plate and contact means supported on said frame in engagement with said plate and adapted to be connected and disconnected by movement of said plate.

8. The mechanism of claim 7 wherein said frame includes side rails and end pieces connected together and said locking means is pivotally secured to said plate to effect a locking of said plate against movement in one sense through a bearing engagement with an end piece in compression at one end of said frame, the said plate being driven against the end piece of the frame at the opposite end of said frame by the opposite drive means.

9. The drive mechanism of claim 7 wherein said drive means include means connected thereto to provide a pulling action to effect the drive of said plate and the locking means are pivotally mounted on said plate and biased to rotate into a position compressively bearing against portions of said frame member.

10. In a drive mechanism for use with electrical switching or connecting apparatus a frame member having an opening therein, a plate disposed in said opening carrying contact means thereon, further contact means disposed on said frame bearing against said plate so as to be connected or disconnected by displacement of said plate, a solenoid attached to said frame at each end thereof and a locking mechanism connected between a solenoid and said plate, said locking mechanism being operable responsive to the solenoid at an opposite end of said frame to lock said plate against movement and being operable responsive to a solenoid at the same end of said frame to unlock said plate for movement whereby movement of said plate requires an alternate energization of said solenoids.

11. In an assembly for switching or connecting electrical circuits the combination comprising a frame member of rigid construction having an opening therein, a plate member of rigid construction dimensioned to fit within said opening and to be displaced therein relative to said frame member, a series of conductive paths secured to said plate member and insulated each from the other by insulating material secured to said plate member, a series of contact banks secured to said frame and overlying said plate member, a plurality of spring contact members held in said contact banks to extend inwardly and engage said plate member under residual spring pressure, circuit leads attached to said contact spring members, means connected to said frame member and to said plate member and operable to displace said plate member wherein to displace said conductive paths to connect and disconnect selected ones of said contact members by selected engagement of said conductive paths, said means including a motor and drive linkage at each end of said frame member with said motor and drive linkage being alternately operable wherein energization of one motor at one end of said frame member pulls said plate member to effect a switching and connecting function and the linkage associated with the drive at the other end of said frame member operates responsive to displacement of said plate member to latch said plate member against movement thereof in an opposite sense to that effected by energization of said one motor.

12. The assembly of claim 11 wherein said contact banks are secured on said frame on opposite sides of said opening so that said spring contact members engage said plate member from opposite sides, said plate member being centered in said opening in a sense transverse to said switch banks by said spring contact members.

References Cited

UNITED STATES PATENTS

| | | | |
|---|---|---|---|
| 376,072 | 1/1888 | Cole | 200—16 |
| 1,123,758 | 1/1915 | Knoblock. | |
| 2,672,531 | 3/1954 | Stevenson. | |
| 3,157,751 | 11/1964 | Van den Berk. | |
| 3,160,455 | 12/1964 | Mayon et al. | 339—17 |
| 3,196,219 | 7/1965 | Gardineer | 200—5 |
| 3,225,149 | 12/1965 | Shlesinger. | |
| 3,242,273 | 3/1966 | Van der Put. | |
| 3,230,330 | 1/1966 | Bauer. | |

ROBERT K. SCHAEFER, *Primary Examiner.*

M. GINSBURG, *Assistant Examiner.*